United States Patent [19]
Madsen et al.

[11] 3,847,818
[45] Nov. 12, 1974

[54] APPARATUS FOR SEPARATING FLUIDS INTO TWO FRACTIONS BY MEANS OF SEMIPERMEABLE MEMBRANES

[75] Inventors: Rud Frik Madsen; Ole Jentoft Olsen; Mogens Martin Stenseng, all of Nakskov, Denmark

[73] Assignee: Aktieselskabet De Danske Sukkerfabrikker, Copenhagen K., Denmark

[22] Filed: Feb. 2, 1973

[21] Appl. No.: 329,195

[30] Foreign Application Priority Data
Feb. 2, 1972 England .............................. 4972/72

[52] U.S. Cl. ................. 210/321, 210/336, 210/347, 210/433
[51] Int. Cl. ............................................. B01j 31/00
[58] Field of Search ........... 210/321, 336, 346, 347, 210/433; 55/158; 159/DIG. 27

[56] References Cited
UNITED STATES PATENTS
3,398,833   8/1968   Marks et al. ..................... 210/347 X
3,623,610   11/1969  Olsen et al. ...................... 210/433 X
3,398,834   8/1968   Huttall et al. .................... 210/433 X
3,456,805   7/1969   Jarvis et al. ...................... 210/321

Primary Examiner—Frank A. Spear, Jr.
Attorney, Agent, or Firm—Watson, Cole, Grindle & Watson

[57] ABSTRACT

Apparatus for separating liquids into two fractions by reverse osmosis or ultrafiltration, comprising a stack of alternating circular membranes, circular membrane support plates and circular guide plates, said guide plates having a plurality of apertures extending through said plates at their peripheral edges, said stack comprising a centrally located hole extending longitudinally of the stack, a bolt inserted in said hole so as to form an annular duct adjacent to the surface of said bolt, each guide plate comprising at least one sealing member located within said duct so as to divide it into at least two flow passages, some of said sealing members having supply channels each connecting the flow passage containing liquid to be treated with a space between a membrane and the adjacent guide plate and some sealing members comprising discharge channels each connecting a space between a membrane and the adjacent guide plate with the second flow passage so as to obtain a combined parallel and series flow pattern.

3 Claims, 2 Drawing Figures

APPARATUS FOR SEPARATING FLUIDS INTO TWO FRACTIONS BY MEANS OF SEMIPERMEABLE MEMBRANES

BACKGROUND OF THE INVENTION.

This invention relates to an apparatus for separating liquids into two fractions by means of semipermeable membranes and more particularly to an apparatus for the separation of a liquid into two fractions by reverse osmosis or ultrafiltration.

A prior art apparatus of this type comprises a stack of alternating guide plates and membrane supports, each membrane support supporting a semipermeable membrane on each side of the support so as to form flow passages extending parallel to the membrane surfaces, each of said guide plates being provided with apertures extending through said guide plate, liquid inlet means and liquid outlet means communicating with the flow passages extending parallel to the membrane surfaces and means for collecting and discharging the liquid passing through said membranes.

In an apparatus of this type the liquid to be treated flows through a large number of flow passages each formed between a membrane and a guide plate in a series flow pattern.

In order to obtain an efficient operation of such an apparatus it is essential that the liquid to be treated flows along the membranes in the form of a thin film and at a high flow rate in order to prevent the accumulation of solid material in the form of coatings on the membrane surfaces.

Furthermore, it is essential that the pressure drop across the apparatus is low in order to minimize the energy consumption and to obtain uniform conditions throughout the apparatus.

In the above mentioned prior art apparatus in which the liquid to be treated successively passes along the membrane surfaces, a high flow rate is obtainable only at the expense of a high pressure drop.

The object of the invention is to provide an apparatus having a large exposed membrane surface area and allowing a high flow rate with a relatively low pressure drop.

SUMMARY OF THE INVENTION

According to the invention, an apparatus of the above mentioned type is characterized by the fact that the stack of guide plates and membrane supports comprises a longitudinally extending duct spaced apart from the apertures in the guide plates, and that each guide plate comprises at least one sealing member located within said longitudinally extending duct, said sealing member being mounted so as to form at least two flow passages, one flow passage being connected to the liquid inlet means and the second flow passage being connected to the liquid outlet means, some of said sealing means comprising supply channels connecting said first longitudinally extending flow passage with a flow passage extending parallel to the membrane surfaces and some sealing means comprising discharge channels connecting a flow passage extending parallel to the membrane surfaces with the said second longitudinally extending flow passage.

When using the apparatus of the invention in a reverse osmosis or ultrafiltration process, liquid under high pressure is pumped into the liquid inlet means. The liquid thus introduced flows through the first longitudinally extending flow passage and passes through the supply channels into the flow passages extending parallel to the membrane surfaces. The liquid then flows along said membrane surfaces until it reaches the region in which the apertures in said guide plates are provided. The liquid then flows through the guide plates and into the flow passage located at the opposite side of the guide plate and then in the opposite direction towards said first longitudinally extending flow passage. When the liquid has reached the edge of the membrane and the membrane support, it is again deflected and passes into the adjacent flow passage extending parallel to the membrane surfaces. In this manner the liquid flows along the surfaces of a number of semipermeable membranes until it reaches a guide plate having a sealing member provided with a discharge channel. At this level part of the liquid passes out through said channel into the second longitudinally extending flow passage and from this passage into the liquid outlet means while the remaining part of the liquid flows further on through the stack in a zigzag flow pattern. Since the liquid to be treated is introduced into the flow passages extending parallel to the membrane surfaces at various levels of the stack, it will be understood that the flow pattern through the stack is a combined parallel and series flow. Consequently, it is possible to maintain a high flow rate at a relatively low pressure drop across the apparatus.

It will also be understood that by locating guide plates having sealing members with supply channels and guide plates having discharge channels at suitable levels of the stack, the flow pattern can be adjusted as desired.

In a preferred embodiment of the apparatus of the invention the membrane supports and the guide plates are essentially circular plates and a bolt is preferably mounted within the longitudinally extending hole. In this embodiment the apertures in the guide plates are preferably provided at the outer edges of said plates and the sealing members are spaced from the bolt so as to form an annular flow passage adjacent to said bolt and extending longitudinally of said stack. In that case the annular flow passage forms the second longitudinally extending flow passage. This embodiment is particularly advantageous because of the ease with which the membrane supports and the guide plates can be stacked.

Each sealing member preferably comprises a passage extending longitudinally of the stack which passages together form said first longitudinally extending flow passage.

Figure 1:
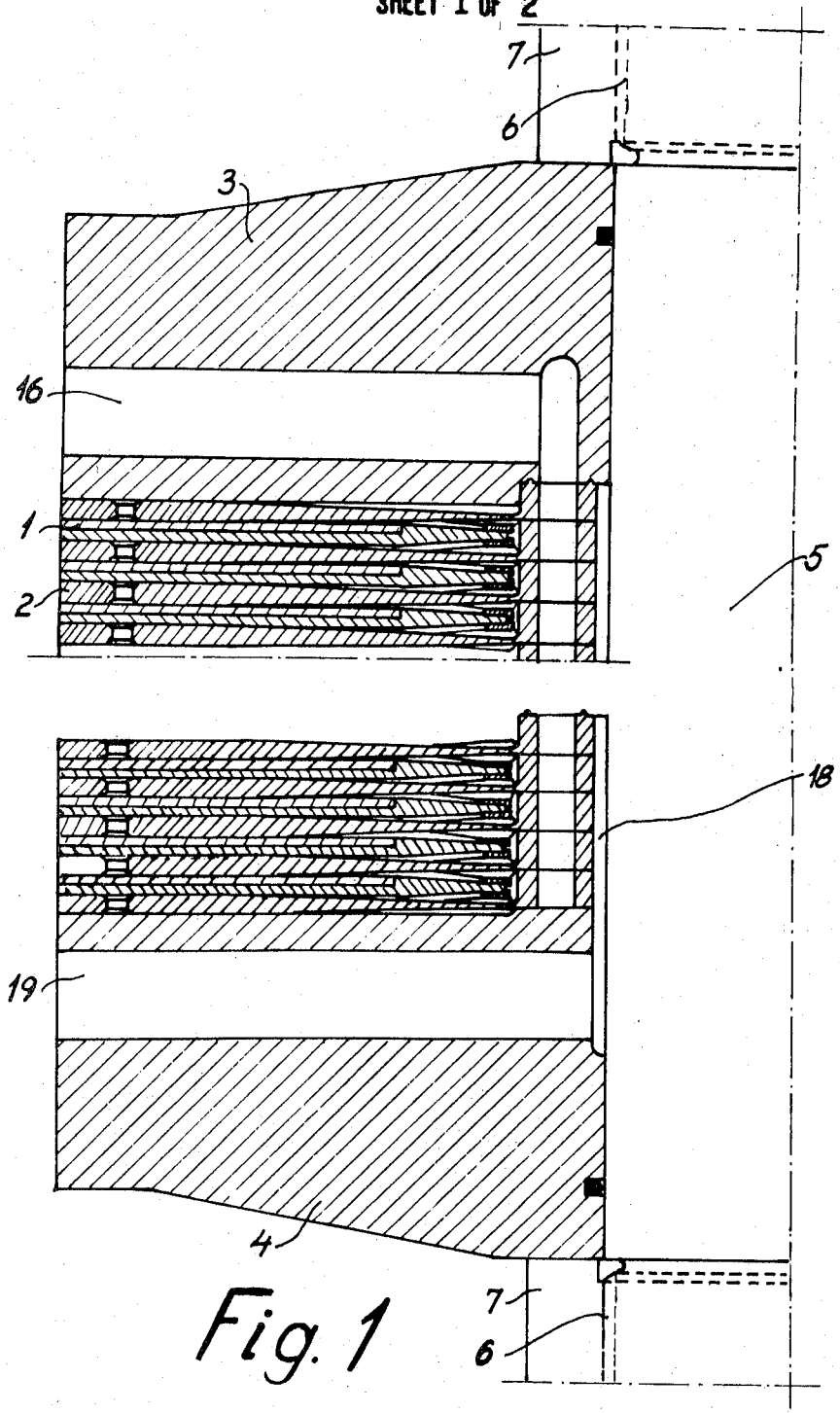
FIG. 1 shows a sectional view of a part of an apparatus of the invention comprising a stack of alternating annular membrane support plates and guide plates.

DESCRIPTION OF THE PREFERRED EMBODIMENTS.

The apparatus shown in the drawings comprises a stack of annular membrane support plates 1 and annular guide plates 2, the plates 1 and 2 are pressed together by means of two annular pressed plates 3 and 4 which are mounted on a shaft 5 comprising screw threads 6 at its ends and screws 7. Each membrane support plate 1 is provided with grooves at both surfaces and has a liquid discharge tube 8 inserted in the edge thereof and communicating with the surfaces of said membrane support plate. Annular sheets 9 of filter paper contact the surfaces of the membrane support plates and located on top of said sheets 9 there are provided membranes 10 which are firmly attached to the inner edges of the membrane support plates 1 by means of rings 11. The guide plates 2 comprise at their outer edges passages 12 and at their inner edges sealing members 13, the guide plates also comprise projections 14 located adjacent to the sealing members and serving to press the rings 11 in contact with the edges of the membrane support plates 1. Each sealing member comprises a longitudinally extending passage 15 which at the top of the stack communicates with a liquid inlet means 16. Some of the guide plates 2 are provided with passages 17 which connect the zone between a membrane and the adjacent guide plate with an annular passage formed between said sealing member and the shaft 5. The annular passage 18 communicates with a liquid discharge passage 19. Some of the guide plates 2 comprise a passage 20 connecting the zone between a membrane and the adjacent guide plate with the longitudinally extending passage 15.

When the apparatus shown in the drawing is used for ultrafiltration, liquid under pressure is pumped into the apparatus through the liquid inlet passage 16. The liquid thus introduced flows longitudinally of the stack through the passage 15 and from said passage through the passages 20 into the zone between the adjacent membrane and the guide plate supporting the sealing members in which the passages 20 are formed. The liquid thus introduced then flows along the membranes in a zigzag flow pattern as shown in the drawing and subsequently the liquid thus treated flows through the passages 17 into the annular passage 18 and from the latter into the liquid discharge passage 19.

Figure 2:
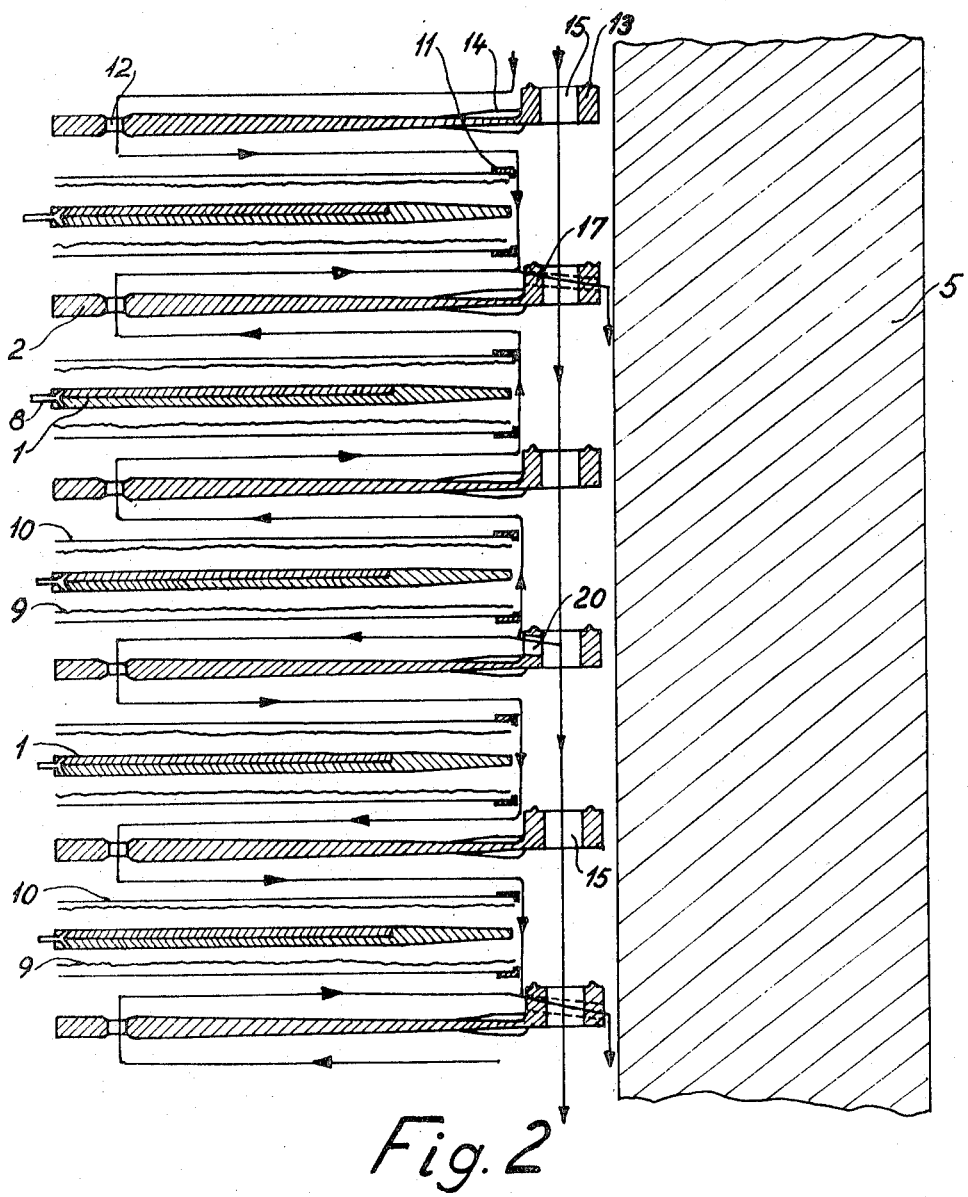
FIG. 2 shows a sectional view as in FIG. 1 in enlarged scale and with the plates separated from one another.

The filtrated liquids which are collected in the grooves of the membrane support plates are discharged through the pipes 8. As will appear from FIG. 2 the liquid to be treated in the apparatus of the invention flows through the stack of membrane support plates and guide plates in a combined parallel and series flow. This flow pattern can be adjusted to the properties of the liquid to be treated by inserting proper guide plates at proper levels of the stack.

We claim:

1. An apparatus for separating fluids into two fractions by means of semipermeable membranes comprising a stack of alternating guide plates and membrane supports, each membrane support supporting a semipermeable membrane on each side of the support so as to form flow passages extending parallel to the membrane surfaces, each of said guide plates being provided with apertures extending through the guide plates, liquid inlet means and liquid outlet means communicating with said flow passages extending parallel to the membrane surfaces and means for collecting and discharging liquid passing through said membranes, characterized in that the stack of guide plates and membrane supports comprises a longitudinally extending duct spaced apart from the apertures of the guide plates, and that each guide plate comprises at least one sealing member located within said longitudinally extending duct, said sealing members being mounted so as to form at least two longutidinally extending flow passages, one of said longitudinally extending flow passages being connected to the liquid inlet means, and the second longitudinally extending flow passage being connected to the liquid outlet means, some of said sealing members comprising supply channels connecting the first longitudinally extending flow passage with a flow passage extending parallel to the membrane surfaces and some sealing members comprising discharge channels connecting a flow passage extending parallel to the membrane surfaces with the said second longitudinally extending flow passage.

2. An apparatus as in claim 1, characterized in that the membrane supports and the guide plates are circular plates and each comprises a centrally located hole which holes are aligned so as to form said longitudinally extending duct and that the apparatus further comprises a bolt connected to end flanges at the end of the stack and mounted within said central duct so as to form a second longitudinally extending flow passage in the zone between the interior surface of said sealing members and the exterior surface of said bolt.

3. An apparatus as in claim 2, characterized in that each sealing member comprises a passage extending longitudinally of the stack, said passages forming together said first longitudinally extending flow passage.

* * * * *